US011118562B2

(12) United States Patent
Spandley et al.

(10) Patent No.: US 11,118,562 B2
(45) Date of Patent: Sep. 14, 2021

(54) WIND TURBINE BLADES

(71) Applicant: Vestas Wind Systems A/S, Aarhus N. (DK)

(72) Inventors: Luke Spandley, Ventnor (GB); Chris Cieslak, Hove (GB)

(73) Assignee: Vestas Wind Systems A/S, Aarhus N. (DK)

( * ) Notice: Subject to any disclaimer, the term of this patent is extended or adjusted under 35 U.S.C. 154(b) by 700 days.

(21) Appl. No.: 15/035,669

(22) PCT Filed: Nov. 10, 2014

(86) PCT No.: PCT/DK2014/050375
§ 371 (c)(1),
(2) Date: May 10, 2016

(87) PCT Pub. No.: WO2015/067281
PCT Pub. Date: May 14, 2015

(65) Prior Publication Data
US 2016/0305399 A1 Oct. 20, 2016

(30) Foreign Application Priority Data
Nov. 11, 2013 (GB) ..................... 1319866

(51) Int. Cl.
*F03D 1/06* (2006.01)
*B29C 70/34* (2006.01)
(Continued)

(52) U.S. Cl.
CPC .......... *F03D 1/0675* (2013.01); *B29C 70/342* (2013.01); *B29C 70/443* (2013.01);
(Continued)

(58) Field of Classification Search
CPC ..... F03D 1/0675; F03D 1/0683; B29C 70/30; B29C 70/342; B29C 70/345;
(Continued)

(56) References Cited

U.S. PATENT DOCUMENTS

| 7,500,494 B2 * | 3/2009 | Robinson ............... B29C 70/32 138/172 |
| 7,673,654 B2 * | 3/2010 | Rice ................... F16L 55/1686 138/97 |

(Continued)

FOREIGN PATENT DOCUMENTS

| CN | 101646866 A | 2/2010 |
| CN | 102886902 A | 1/2013 |

(Continued)

OTHER PUBLICATIONS

Intellectual Property Office, Combined Search and Examination Report dated Jun. 24, 2014 in Application No. GB1319866.8.
(Continued)

*Primary Examiner* — David E Sosnowski
*Assistant Examiner* — Wayne A Lambert
(74) *Attorney, Agent, or Firm* — Wood Herron & Evans LLP

(57) ABSTRACT

A method of making a wind turbine blade comprises stacking a plurality of strips of fibre-reinforced polymeric material one on top of another to form a stack of strips (40); strapping the stack of strips together by means of at least one strap (41) made from a fibrous material, and thereby forming a strapped stack; infusing the strapped stack with resin; and curing the resin to form an elongate spar structure in which the at least one strap (41) is integrated with the stack of strips.

21 Claims, 7 Drawing Sheets

(51) Int. Cl.
*B29C 70/44* (2006.01)
*B29C 70/54* (2006.01)
*B29D 99/00* (2010.01)
B29K 105/08 (2006.01)
B29K 309/08 (2006.01)
B29L 31/08 (2006.01)

(52) U.S. Cl.
CPC ........ B29C 70/543 (2013.01); B29D 99/0028 (2013.01); *B29K 2105/089* (2013.01); *B29K 2309/08* (2013.01); *B29L 2031/085* (2013.01); *F05B 2230/23* (2013.01); *F05B 2280/6003* (2013.01); *F05B 2280/6015* (2013.01); *Y02E 10/72* (2013.01); *Y02P 70/50* (2015.11)

(58) Field of Classification Search
CPC . B29C 70/443; B29C 70/543; B29D 99/0028; B29K 2309/08; B29K 2105/089; B29L 2031/085; F05B 2280/6015; F05B 2280/6003; F05B 2230/23; Y02E 10/721; Y02P 70/523
See application file for complete search history.

(56) References Cited

U.S. PATENT DOCUMENTS

| | | | | |
|---|---|---|---|---|
| 7,988,423 B2* | 8/2011 | Hancock | ............... | F03D 1/0675 |
| | | | | 416/226 |
| 8,047,798 B2* | 11/2011 | Bech | ....................... | F03D 1/065 |
| | | | | 416/230 |
| 9,181,923 B2* | 11/2015 | Grabau | .................. | B29C 33/12 |
| 2006/0188378 A1* | 8/2006 | Bech | .................. | B29C 66/1312 |
| | | | | 416/227 R |
| 2007/0107791 A1* | 5/2007 | Rice | ........................ | B29C 70/32 |
| | | | | 138/99 |
| 2009/0169392 A1* | 7/2009 | Kuroiwa | ............... | F03D 1/0675 |
| | | | | 416/241 A |
| 2009/0196756 A1* | 8/2009 | Althoff | ................. | F03D 1/0675 |
| | | | | 416/226 |
| 2010/0314028 A1* | 12/2010 | Hedges | ................. | B29C 70/083 |
| | | | | 156/93 |
| 2011/0031758 A1* | 2/2011 | Mitsuoka | ................ | B32B 15/06 |
| | | | | 290/55 |
| 2011/0100540 A1* | 5/2011 | Mathew | ............. | B29D 99/0028 |
| | | | | 156/245 |
| 2011/0142679 A1* | 6/2011 | Bendel | .................. | B29C 66/721 |
| | | | | 416/241 R |
| 2011/0243750 A1* | 10/2011 | Gruhn | .................... | B29B 11/16 |
| | | | | 416/226 |
| 2012/0082554 A1* | 4/2012 | Baker | ................... | F03D 1/0675 |
| | | | | 416/226 |
| 2012/0093656 A1 | 4/2012 | Esaki et al. | | |
| 2013/0171381 A1* | 7/2013 | Grove-Nielsen | ......... | D01F 8/00 |
| | | | | 428/34.1 |

FOREIGN PATENT DOCUMENTS

| | | |
|---|---|---|
| CN | 202911157 U | 5/2013 |
| GB | 1368642 A | 10/1974 |
| WO | 2009059604 A1 | 5/2009 |
| WO | 2010065928 A1 | 6/2010 |
| WO | 2012092927 A1 | 7/2012 |

OTHER PUBLICATIONS

European Patent Office, International Search Report and Written Opinion dated Feb. 13, 2015 in International Patent Application No. PCT/DK2014/050375.
Anonymous: "Keyword: fiberglass tape", Jan. 1, 2008 (Jan. 1, 2008), XP002734866, Retrieved from the Internet <URL:http://www.jamestowndistributors.com/userportal/search.do?freeText=fiberglass%20tape&resultPref=all&page32 GRID&history=>[retrieved on Jan. 22, 2015].
Anonymous: "Plain weave fibre glass", Oct. 15, 2008 (Oct. 15, 2008), XP002734867, Retrieved from the Internet <URL:http://boatcraft.com.au/Shop/index.php?main_page=product_info&cPath=40_41&products_id=168> [retrieved on Jan. 22, 2015].
The State Intellectual Property Office of China, Translation of First Notification of Office Action in CN Application No. 201480072057.0, dated Mar. 24, 2017.

* cited by examiner

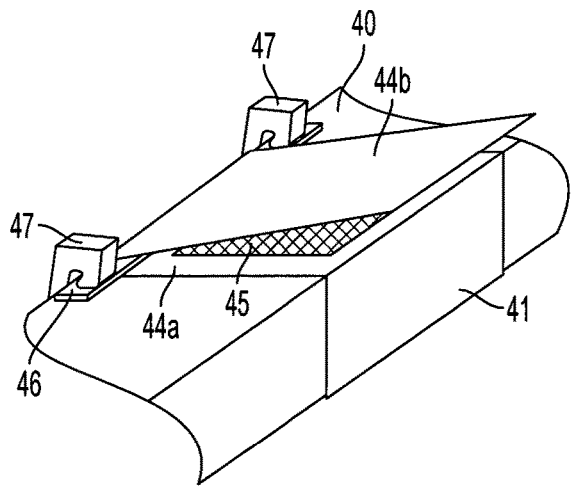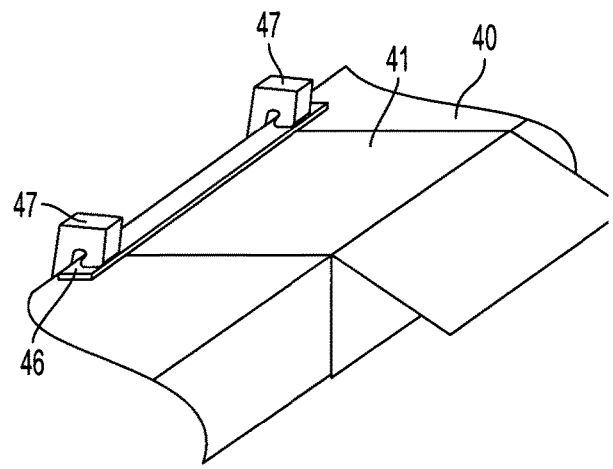
FIG. 8  FIG. 9
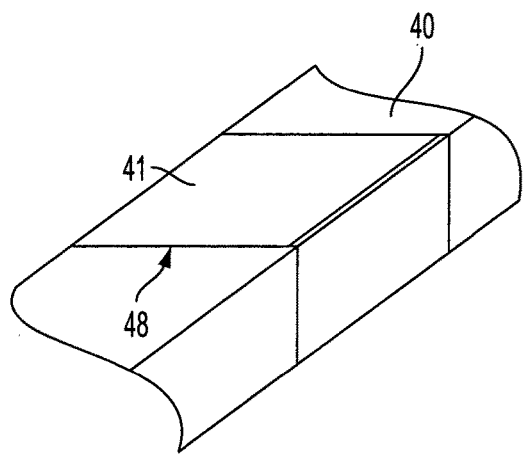
FIG. 10
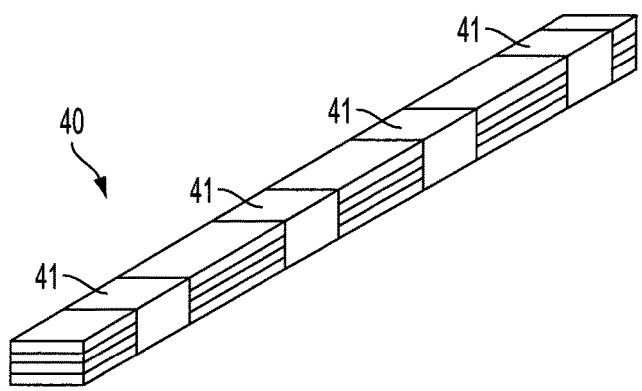
FIG. 11

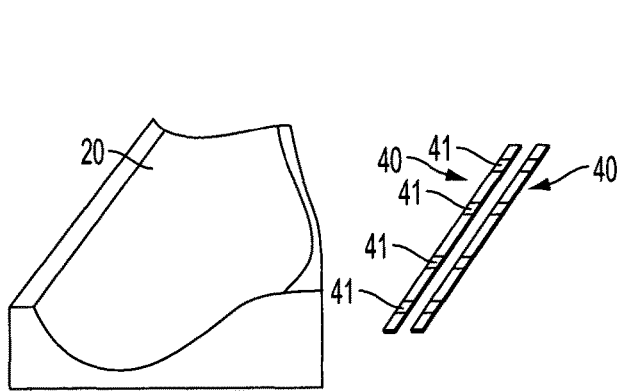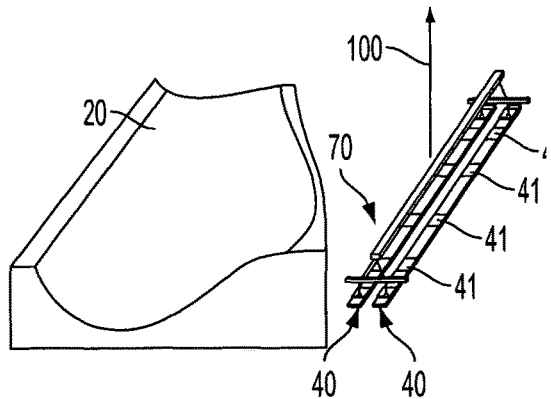
FIG. 12  FIG. 13
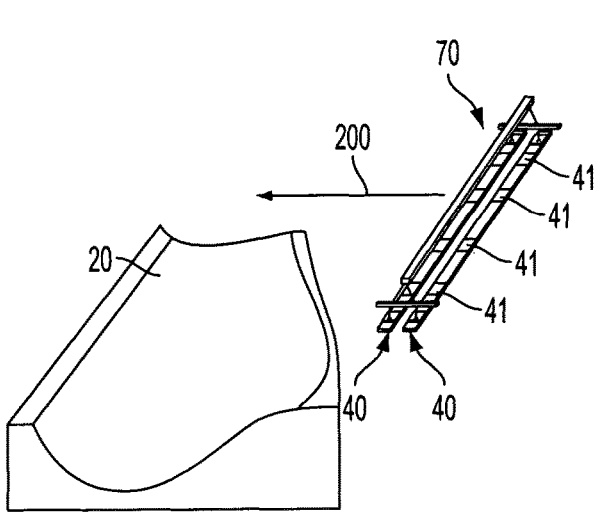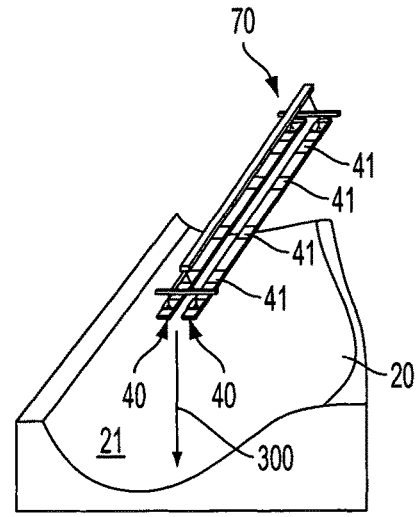
FIG. 14  FIG. 15
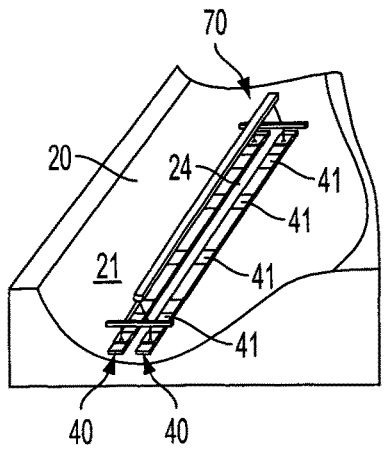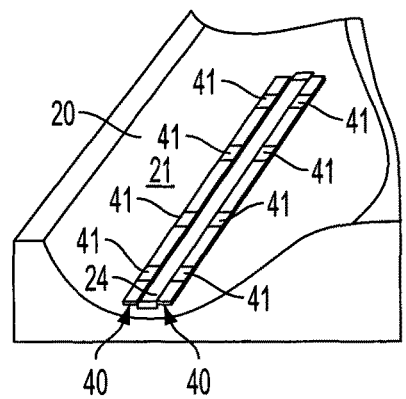
FIG. 16  FIG. 17

WIND TURBINE BLADES

FIELD OF THE INVENTION

The present invention relates to wind turbine blades and to methods of manufacturing wind turbine blades. More specifically, the present invention relates to wind turbine blades that include a stack of load-bearing reinforcing strips integrated within the structure of the shell.

BACKGROUND TO THE INVENTION

FIG. 1a is a cross-sectional view of a wind turbine rotor blade 10. The blade has an outer shell, which is fabricated from two half shells: a windward shell 11a and a leeward shell 11b. The shells 11a and 11b are moulded from glass-fibre reinforced plastic (GRP). Parts of the outer shell 11 are of sandwich panel construction and comprise a core 12 of lightweight foam (e.g. polyurethane), which is sandwiched between inner 13 and outer 14 GRP layers or 'skins'.

The blade 10 comprises a first pair of spar caps 15a and 15b and a second pair of spar caps 16a, 16b. The respective pairs of spar caps 15a and 15b, 16a and 16b are arranged between sandwich panel regions of the shells 11a and 11b. One spar cap 15a, 16a of each pair is integrated with the windward shell 11a and the other spar cap 15b, 16b of each pair is integrated with the leeward shell 11b. The spar caps of the respective pairs are mutually opposed and extend longitudinally along the length of the blade 10.

A first longitudinally-extending shear web 17a bridges the first pair of spar caps 15a and 15b and a second longitudinally-extending shear web 17b bridges the second pair of spar caps 16a and 16b. The shear webs 17a and 17b in combination with the spar caps 15a and 15b and 16a and 16b form a pair of I-beam structures, which transfer loads effectively from the rotating blade 10 to the hub of the wind turbine. The spar caps 15a and 15b and 16a and 16b in particular transfer tensile and compressive bending loads, whilst the shear webs 17a and 17b transfer shear stresses in the blade 10.

Each spar cap 15a and 15b and 16a and 16b has a substantially rectangular cross section and is made up of a stack of pre-fabricated reinforcing strips 18. The strips 18 are pultruded strips of carbon-fibre reinforced plastic (CFRP), and are substantially flat and of rectangular cross section. The number of strips 18 in the stack depends upon the thickness of the strips 18 and the required thickness of the shells 11a and 11b, but typically the strips 18 each have a thickness of a few millimetres and there may be between three and twelve strips in the stack. The strips 18 have a high tensile strength, and hence have a high load bearing capacity.

The blade 10 is made using a resin-infusion process as will now be described by way of example with reference to FIGS. 1b and 1c. Referring to FIG. 1b, this shows a mould 20 for a half shell of a wind turbine blade in cross-section. A glass-fibre layer 22 is arranged in the mould 20 to form the outer skin 14 of the blade 10. Three elongate panels 24 of polyurethane foam are arranged on top of the glass-fibre layer 22 to form the sandwich panel cores 12 referred to above. The foam panels 24 are spaced apart relative to one another to define a pair of channels 26 in between. A plurality of pultruded strips 18 of CFRP, as described above with reference to FIG. 1a, are stacked in the respective channels 26. Three strips 18 are shown in each stack in this example, but there may be any number of strips 18 in a stack.

Referring to FIG. 1c, once the strips 18 have been stacked, a second glass-fibre layer 28 is arranged on top of the foam panels 24 and the stacks of pultruded strips 18. The second glass-fibre layer 28 forms the inner skin 13 of the blade 10. Next, vacuum bagging film 30 is placed over the mould 20 to cover the layup. Sealing tape 32 is used to seal the vacuum bagging film 30 to a flange 34 of the mould 20. A vacuum pump 36 is used to withdraw air from the sealed region between the mould 20 and the vacuum bagging film 30, and resin 38 is supplied to the sealed region. The resin 38 infuses between the various laminate layers and fills any gaps in the laminate layup. Once sufficient resin 38 has been supplied to the mould 20, the mould 20 is heated whilst the vacuum is maintained to cure the resin 38 and bond the various layers together to form the half shell of the blade. The other half shell is made according to an identical process. Adhesive is then applied along the leading and trailing edges of the shells and the shells are bonded together to form the complete blade.

Other examples of rotor blades having spar caps integral with the shell are described in EP 1 520 983, WO 2006/082479 and UK Patent Application GB 2497578.

The CFRP pultruded strips 18 extend along the majority of the length of the wind turbine blade 10. Modern wind turbine blades may be in excess of eighty metres long, and so it will be appreciated that these strips are very long and heavy. The length and weight of the strips presents challenges relating to the manufacture of the blades, and relating to the handling and transportation of the strips. The present invention aims to address these challenges by providing a convenient method of manufacturing this type of wind turbine blade, and by providing apparatus for use in the method.

SUMMARY OF THE INVENTION

Against this background, and from a first aspect, the invention resides in a method of making a wind turbine blade, the method comprising: stacking a plurality of strips of fibre-reinforced polymeric material one on top of another to form a stack of strips; strapping the stack of strips together by means of at least one strap made from a fibrous material, and thereby forming a strapped stack; infusing the strapped stack with resin; and curing the resin to form an elongate spar structure in which the at least one strap is integrated with the stack of strips.

When making a wind turbine blade according to a method of the invention, the straps therefore remain in place on the stack as the stack is infused with resin and as the resin is cured. The straps serve to hold the strips together and in alignment with one another during the resin infusion process and during curing of the resin. This results in a high degree of alignment of the strips in the finished elongate spar structure of the wind turbine blade, which improves the performance of the wind turbine blade. Furthermore, because the straps remain in place during the infusion process, there is no need to remove the straps from the stack before infusion, which speeds up the manufacturing process and reduces the amount of manual input required.

The method may comprise arranging the strapped stack in a mould and infusing the strapped stack with resin in the mould.

Preferably, the method comprises comprising stacking and strapping the strips outside the mould and transferring the strapped stack into the mould.

The mould may be a blade shell mould, and the method may comprise arranging the strapped stack in the blade shell mould together with other structural components of the blade, and infusing the strapped stack and the other structural components with resin in the blade shell mould. In this way, the strapped stack and the other structural components may be infused in a single infusion process, thereby reducing the number of process steps required.

Alternatively, the method may further comprise transferring the cured elongate spar structure from the mould to a blade shell mould and integrating the cured spar structure with other structural components of the blade in the blade shell mould. Integrating the cured spar structure with other structural components of the blade may comprise infusing the cured spar structure and the other structural components with resin.

In other embodiments, the strips may be stacked outside the mould, and then transferred to the mould to be strapped and infused. The strips may also be stacked directly into the blade mould, then strapped together inside the blade mould. In still other embodiments, the strips may be stacked and strapped outside the mould to form the strapped stack, and the strapped stack may then be fully or partially cured outside the mould. The fully- or partially-cured strapped stack may then be transferred to the mould for subsequent resin infusion with the other structural components of the wind turbine blade.

Transferring the strapped stack may comprise lifting the strapped stack and lowering the strapped stack into the blade mould. In this way, the stack can be transferred to the mould with relatively little movement. Alternatively, the strapped stack could be transferred to the mould by sliding the strapped stack into the mould from one end.

The method may comprise strapping the stack of strips together by wrapping the or each strap around the stack of strips.

To wrap the strap around the stack particularly securely, the method may comprise fixing a first end of the strap to the stack and wrapping the remainder of the strap around the stack such that a second end of the strap overlaps the first end, and fixing the overlapping first and second ends together.

So that the first end of the strip may be fixed to the stack whilst avoiding damage to the strap or the stack, the method may comprise fixing the first end of the strap to the stack by clamping the first end of the strap to the stack using a removable clamp, and may comprise removing the removable clamp from the strap after fixing the overlapping first and second ends together.

The method may comprise bonding the overlapping first and second ends of the strap together by means of an adhesive layer. The adhesive layer may be a layer of thermoplastic adhesive material. In this way, the overlapping ends can be bonded by application of heat. Using a thermoplastic adhesive material also permits flexibility of the bond between the overlapping ends.

The adhesive layer may have a web, mesh or grid structure. This allows resin to infuse through and into the adhesive layer, so that the adhesive layer does not interfere with the infusion process.

To hold the strips in place particularly securely, the method may comprise tensioning the strap around the stack of strips. A particular advantage of tensioning the strap is that as the strap is tensioned around the stack, any that are initially out of alignment are pulled into alignment by the tension in the strap.

To guard against wrinkling of fibrous layers forming part of the blade structure, the method may comprise arranging a layer of pre-cured material over the stack and arranging one or more fibrous layers over the pre-cured layer before infusing the components with resin.

The invention also extends to a wind turbine blade made according to the method described above.

From another aspect, the invention resides in an elongate spar structure for a wind turbine blade, the spar structure comprising a stack of strips of fibre-reinforced polymeric material strapped together with at least one strap made of a fibrous material, wherein the strap is integrated with the stack by cured resin.

The at least one strap may be made from a fibrous material having a density between 50 and 500 grams per square metre. In this way, the fibre density may be low enough to permit unhindered infusion of resin through the strap. The at least one strap may be made of a glass fibre material.

The at least one strap may be wrapped around the stack such that first and second ends of the strap overlap. To fix the strap in place, a layer of adhesive material may be provided between the overlapping first and second ends of the strap.

The adhesive material may be a thermoplastic adhesive material, such that the overlapping ends can be bonded together by application of heat.

To permit infusion of resin into and through the layer of adhesive material, such that the bond between overlapping end regions does not affect the infusion process, the layer of adhesive material may be formed as a web, mesh or grid structure.

The elongate spar structure may comprise a plurality of straps.

The invention also extends to a wind turbine blade comprising one or more elongate spar structures described above.

From another aspect, the invention resides in an infusible strap configured to be secured around a stack of fibre reinforced strips of polymeric material, the stack of strips forming a spar structure of a wind turbine blade, and the strap being configured to maintain the relative alignment between the strips when the stack is lifted and transferred into a wind turbine blade mould, and to maintain the relative alignment of the strips during a resin-infusion stage, wherein the infusible strap is compatible with the resin used in the infusion process and is further configured to permit resin to infuse therethrough so that the strap can be integrated with the spar structure in a finished wind turbine blade.

BRIEF DESCRIPTION OF THE DRAWINGS

FIGS. 1a to 1c have already been described above by way of background to the invention. In order that embodiments of the invention might be more readily understood, reference will now be made, by way of example only, to the accompanying drawings, in which:

FIG. 4b is a perspective exploded view of a joint region forming part of the strap of FIGS. 3 and 4a; and FIGS. 5 to 20 illustrate stages in a method of making an elongate reinforcing structure for a wind turbine blade, according to an embodiment of the invention.

DETAILED DESCRIPTION OF EMBODIMENTS OF THE INVENTION

Figure 2:
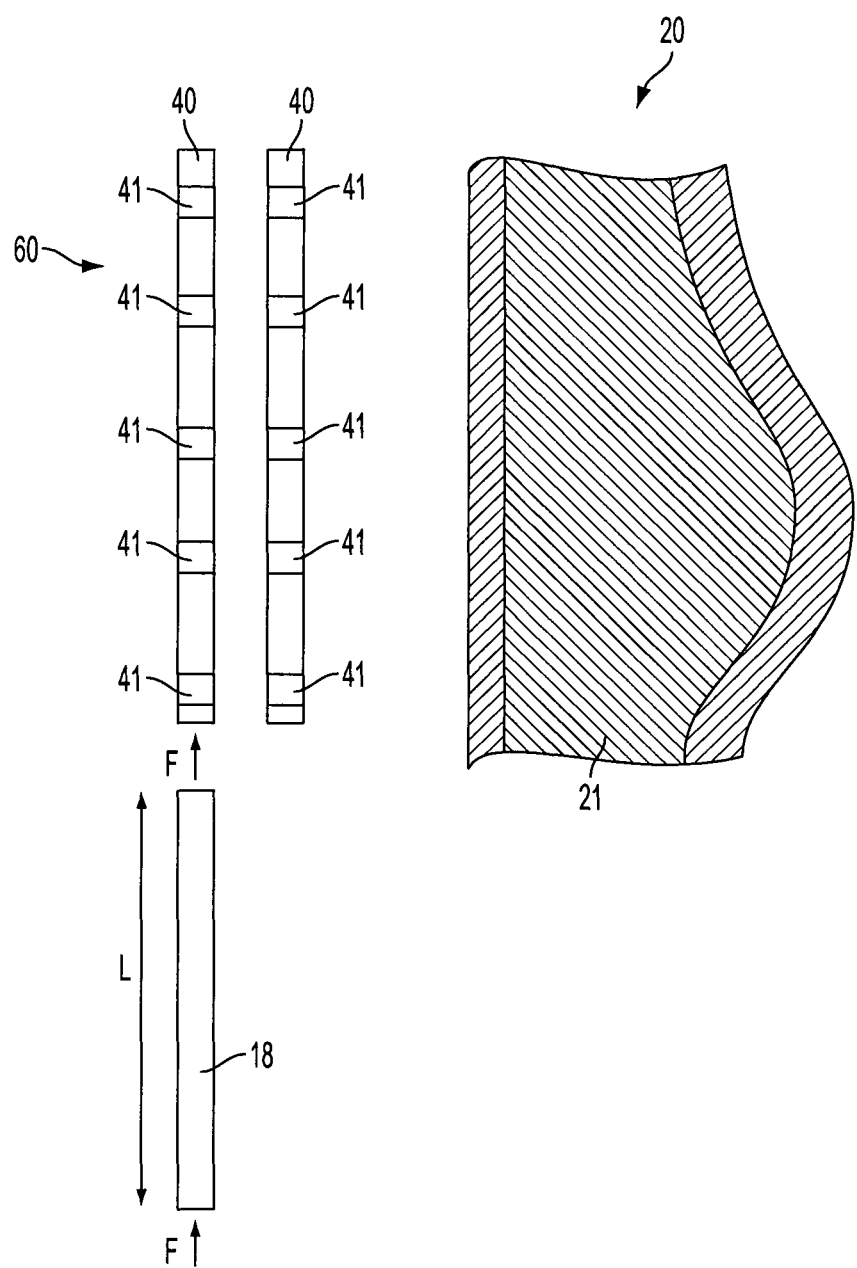
FIG. 2 is a schematic plan view of apparatus for making a wind turbine blade.

FIG. 2 illustrates a wind turbine blade mould 20 for moulding a wind turbine blade of the type described above by way of introduction to the present invention. More specifically, the blade mould 20 is used for making wind turbine blades comprising spar caps that extend along a longitudinal axis L, and that comprise a plurality of strips 18 of fibre reinforced polymeric material arranged one on top of another in a stack.

Figure 1A:
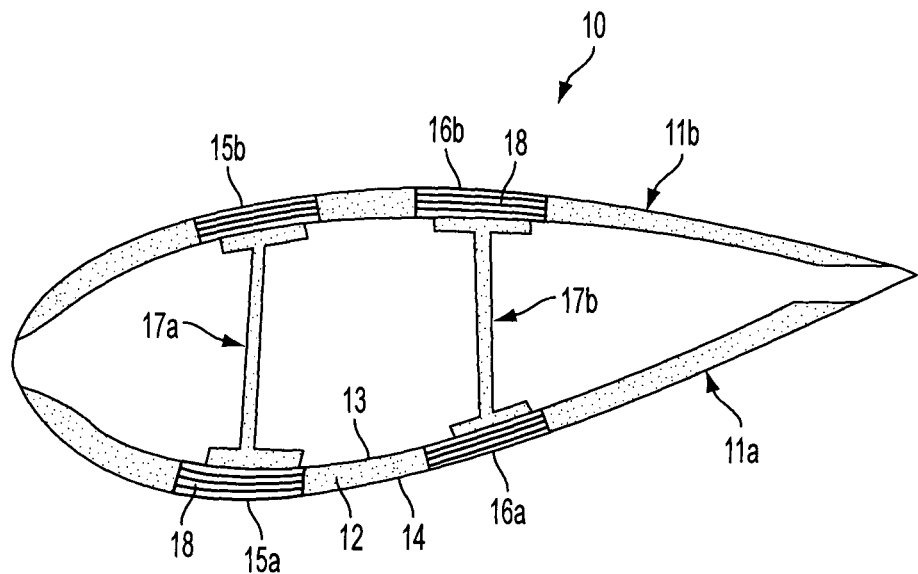
Figure 1B:
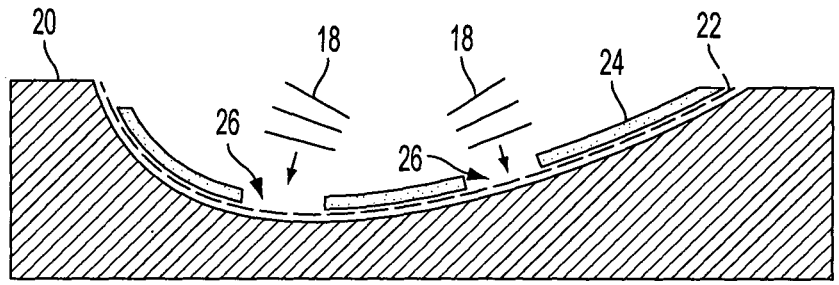
Figure 1C:
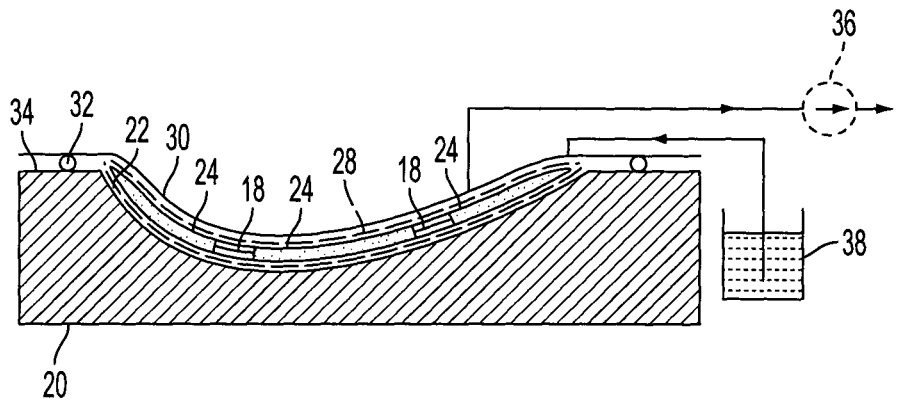

An alignment zone, generally indicated at 60, is defined on the factory floor adjacent the mould 20. Pultruded strips 18 made from carbon-fibre reinforced plastic (CFRP) are fed to the alignment zone 60 from a down-stream strip manufacturing station or strip feed station (not shown) in a feed direction F. At the alignment zone 60, the strips 18 are stacked up to form two stacks 40 that will later form spar caps 15a, 15b, 16a, 16b, (see FIG. 1a) and the stacks are aligned relative to one another as they will be aligned in the mould 20.

Figure 3:
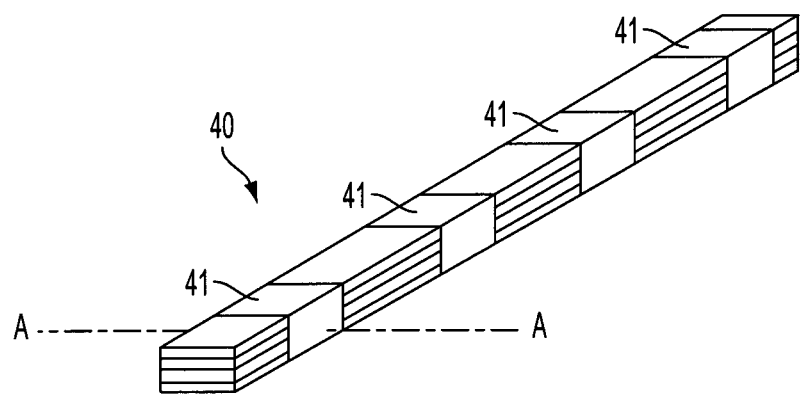
FIG. 3 is a perspective view of a stack of strips for an elongate reinforcing structure for a wind turbine blade, strapped together with a plurality of straps according to an embodiment of the invention.

As seen in FIGS. 2 and 3, the stacks 40 are strapped together with a plurality of straps 41 that keep the strips 18 aligned during handling of the stacks 40, and during subsequent process stages.

Once the stacks 40 have been strapped together, the stacks 40 are lifted from the alignment zone 60, with their relative positions maintained by a support structure (not shown) and then lowered into the mould 20. Other structural components of the blade are then laid in place around the stacks 40. The structural components are covered with a vacuum bag to form a sealed region, air is evacuated from the sealed region, and the sealed region is infused with resin. The resin infuses between the structural components of the blade, including around the stacks 40 and the straps 41. The resin is then cured, forming a blade shell having integrated spar caps 15a, 15b, 16a, 16b, with each spar cap 15a, 15b, 16a, 16b having a plurality of integrated infusible strap 41.

Referring now to FIG. 3, the straps 41 that hold the stacks 40 together are infusible straps. Each strap 41 is made of a lightweight glass fibre cloth or another suitable fibrous material, having a density of approximately 200 grams per square metre (gsm). The fibrous nature of the straps 41 allows resin to infiltrate into the straps 41 during the resin infusion process, as will be described in more detail later. Each strap has a thickness of approximately 0.05 to 0.4 mm, and a width of approximately 50 mm to 150 mm.

The straps 41 fit tightly around the stack 40 such that the straps 41 are under tension. This prevents the strips 18 moving out of alignment with one another during handling of the stack 40, and once the stack 40 is arranged in the blade mould 20. The straps 41 are pulled tightly around the stack 40.

Figure 4A:
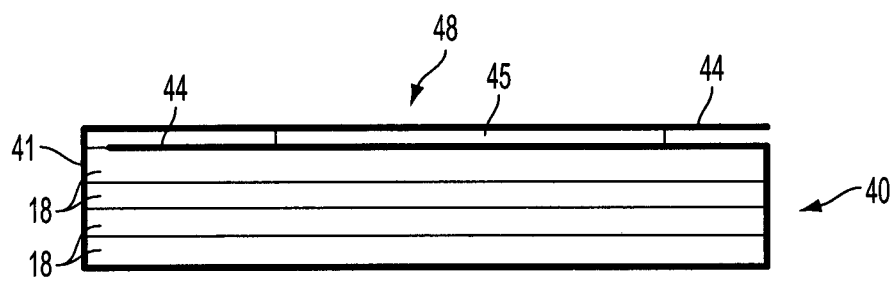
FIG. 4a is a cross-sectional view along the line A-A of FIG. 2.

As best seen in FIG. 4a, end portions 44 of the strap 41 overlap one another at an upper surface of the stack 40 and are bonded to one another by an adhesive layer 45 to form a joint 48.

Figure 4B:
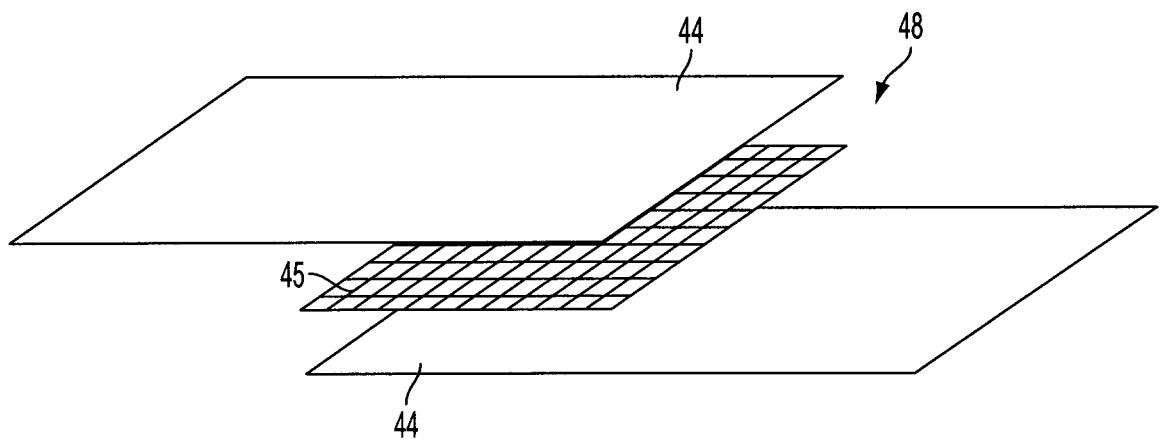

Referring to FIG. 4b, the adhesive layer 45 is a layer of thermoplastic adhesive material formed into an open web structure. The thermoplastic adhesive material adheres the end portions 44 of the strap 41 together, whilst permitting flexibility of the joint 48, so that the strap 41 can be placed under tension without adversely affecting the joint 48. The open web structure allows infusion resin to infiltrate through the joint 48, so that the joint 48 does not interfere with the later infusion process.

The thermoplastic adhesive material is, for example, a copolyester, an aliphatic polyurethane or any other suitable thermoplastic adhesive material. The material is selected so as not to hinder the later infusion process; in particular, an adhesive is selected that does not react chemically with the infusion resin.

A method of making a wind turbine will now be described, with particular reference to FIGS. 5 to 20.

Figure 5:
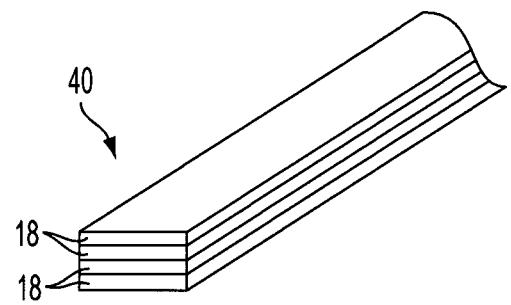

First, a plurality of strips 18 are stacked one on top of another to form a stack 40, as shown in FIG. 5.

Figure 6:
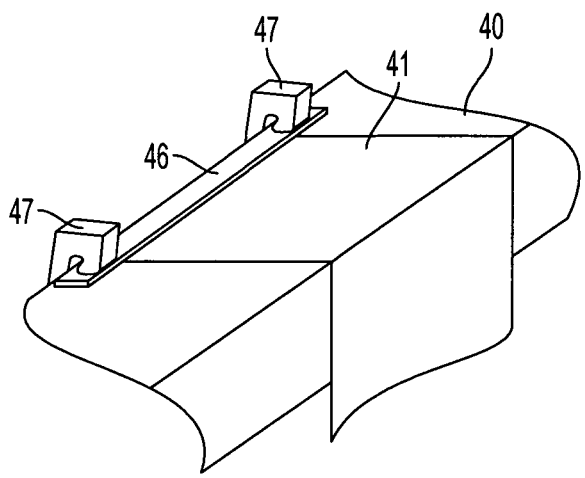
Figure 7:
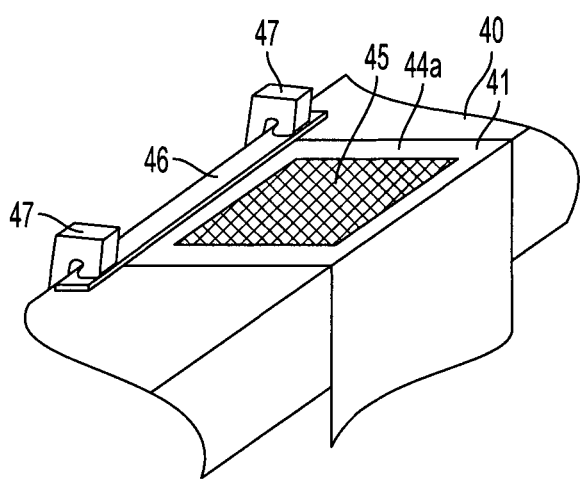

Next, the stack 40 is strapped together by wrapping a strap 41 around the stack 40. To wrap the strap 41 sufficiently tightly, a first end portion 44a of the strap 41 is clamped in place against the stack 40 using a flat, removable clamping piece 46 that extends across the strap 41 and clamps 47 arranged either side of the strap 41, as illustrated in FIG. 6. The adhesive layer 45 is arranged over the first end portion 44a as shown in FIG. 7, and the strap 41 is pulled tightly around the stack 40, until the strap 41 is under the required tension. As shown in FIGS. 8 and 9, a second end portion 44b of the strap 41 is pulled over the first end portion 44a of the strap 41, such that the end portions 44 of the strap 41 overlap with the adhesive layer 45 sandwiched between the overlapping end portions 44. Heat is applied to the end portions by a heating iron, so as to activate the thermoplastic adhesive material and bond the end portions 44 of the strap 41 together. The strap 41 is trimmed if required, and the clamps 47 and removable clamping piece 46 are removed leaving the strap 41 in place around the stack 40, as shown in FIG. 10.

Once the first strap 41 has been fitted as described, further straps 41 are fitted to the stack 40 at regular intervals along the stack 40, as shown in FIG. 11.

The stack 40 is then arranged in the alignment zone 60 defined on the factory floor, with other stacks 40, as shown in FIG. 12. The stacks 40 are aligned relative to one another in the alignment zone 60 in a configuration that matches the eventual configuration of the spar caps 15a, 15b, 16a, 16b in the finished blade 10.

The stacks 40 are then supported in this configuration by a support structure 70, as shown in FIG. 13. Once supported, the stacks 40 are transferred to the mould 20 in the sequence shown in FIGS. 13 to 16. The stacks are lifted upwardly in the direction 100, then moved transversely in the direction 200, and finally lowered in the direction 300 to be laid on the mould surface 21 with a pair of stacks 40 arranged on each side of a foam panel 24. The support structure 70 is then removed leaving the stacks 40 in place in the mould 20, as shown in FIG. 17.

During the transfer process, the straps 41 maintain the alignment of the strips 18 in the stacks 40. In this way, little, if any, subsequent adjustment of the strips 18 is required once the stacks 40 have been arranged in the mould 20. The support structure 70 also maintains the alignment of the stacks 40 during transfer, so that there is no need to rearrange the stacks 40 after the transfer process.

Figure 18:
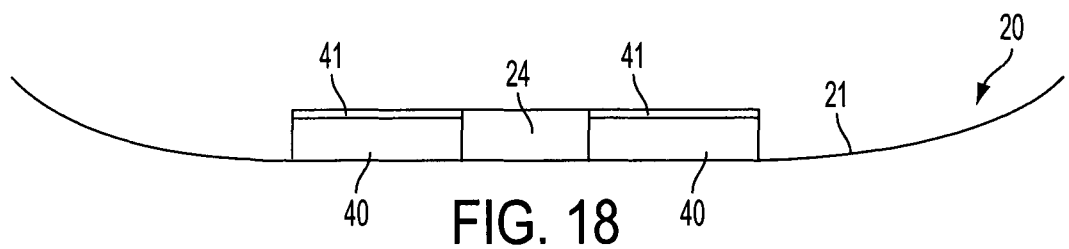
Figure 19:
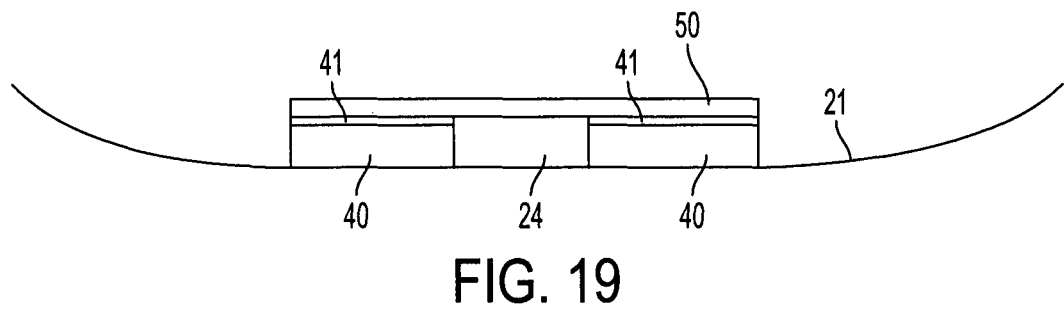
Figure 20:
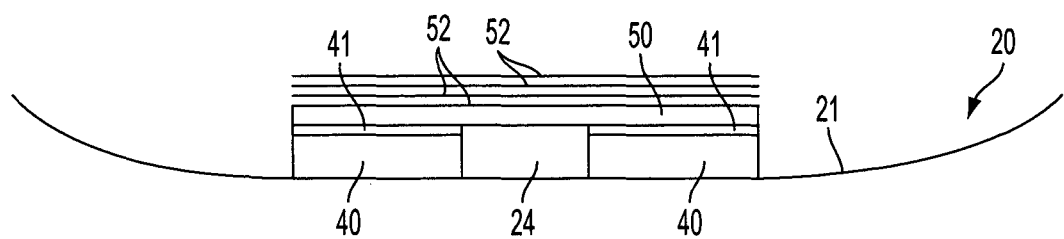

Once the stacks 40 have been arranged in place in the mould, other structural components of the blade are laid on top of the stacks 40, as shown in FIGS. 18 to 20. First, as shown in FIG. 19, a layer of pre-cured mesh material 50 is laid directly on top of the stack 40, such that the straps 41 are sandwiched between the stack 40 and the pre-cured mesh 50. Layers of dry glass fibre fabric 52 are then laid over the pre-cured mesh 50, as shown in FIG. 20. The layer of pre-cured mesh 50 is relatively stiff so that it acts as a wrinkle-preventing layer to prevent the straps 41 from creating wrinkles in the layers of glass fibre fabric 52. The structural components are then covered with a vacuum bag to form a sealed region, air is evacuated from the sealed region using a vacuum pump, and resin is introduced to the sealed region, where it infuses between the components.

As the resin infuses between the structural components of the blade, it infuses around the stacks 40 and into the fibrous material of the straps 41. The fibrous material of the straps 41 is of a low density, thereby ensuring that the strap 41 does not interfere with the infusion process. The open structure of the adhesive layer 45 means that resin can also infuse into and through the adhesive layer 45. The inert nature of the thermoplastic adhesive material means that the layer of adhesive material does not react chemically with the resin. In this way, the strap 41 is infused with resin in the same way as the other components of the blade. When the resin is cured, the strap 41 is therefore integrated with the stack 40, by the cured resin such that the strap 41 forms a structural component of the spar cap 15a, 15b, 16a, 16b.

Accordingly, a particular advantage of the present invention is that it is not necessary to remove the straps 41 once the stacks 40 are in place in the mould 20. This removes a step from the manufacturing process, increasing the speed of the process, and reducing the amount of manual labour required. Furthermore, as the straps 41 remain in place during the infusion process, the straps 41 also serve to maintain the alignment of the strips 18 in the stack 40 as the components are infused with resin, and as the resin is cured.

Although in the embodiment described the straps act primarily to hold the strips of the stack together and in alignment with one another, in other embodiments the straps may also be used to lift the stack into position in the mould.

In some embodiments, a single spar cap may be formed from more than one stack of strips. In this case, the stacks that form the spar cap are arranged side-by-side, and are strapped together by a single strap. This arrangement is useful for creating wider spar caps.

In the embodiment described the joint of the strap 41 is arranged on an upper surface of the stack 40. However, in other embodiments, the joint may be arranged on a side of the stack, particularly if the stack includes a large number of strips and is of a relatively large height. In such embodiments, the joint sits next to the foam panel when the stack is arranged in the mould, and hence the joint is shielded by the foam panel. This further mitigates against the joint causing wrinkles in the glass fibre layers of the wind turbine blade.

The present invention is therefore not limited to the exemplary embodiments described above and many other variations or modifications will be apparent to the skilled person without departing from the scope of the present invention as defined in the following claims.

The invention claimed is:

1. A method of making a wind turbine blade, the method comprising:
    stacking a plurality of strips of fibre-reinforced polymeric material one on top of another to form a stack of strips;
    strapping the stack of strips together by means of at least one strap made from a fibrous material by wrapping the at least one strap around a periphery of the stack of strips, and thereby forming a strapped stack;
    infusing the strapped stack with resin; and
    curing the resin to form an elongate spar structure in which the at least one strap is integrated with the stack of strips,
    wherein wrapping the at least one strap comprises fixing a first end of the at least one strap to the stack, wrapping the remainder of the at least one strap around the stack such that a second end of the at least one strap overlaps the first end, and fixing the overlapping first and second ends together.

2. The method of claim 1, further comprising:
    arranging the strapped stack in a mould and infusing the strapped stack with resin in the mould.

3. The method of claim 2, comprising stacking and strapping the strips outside the mould and transferring the strapped stack into the mould.

4. The method of claim 3, wherein transferring the strapped stack comprises lifting the strapped stack and lowering the strapped stack into the mould.

5. The method of claim 2 wherein the mould is a blade shell mould, and the method comprises arranging the strapped stack in the blade shell mould together with other structural components of the blade, and infusing the strapped stack and the other structural components with resin in the blade shell mould.

6. The method of claim 2 further comprising transferring the cured elongate spar structure from the mould to a blade shell mould and integrating the cured spar structure with other structural components of the blade in the blade shell mould.

7. The method of claim 1, comprising fixing the first end of the strap to the stack by clamping the first end of the strap to the stack using a removable clamp, and comprising removing the removable clamp from the strap after fixing the overlapping first and second ends together.

8. The method of claim 1, comprising bonding the overlapping first and second ends of the strap together by means of an adhesive layer.

9. The method of claim 8, wherein the adhesive layer is a layer of thermoplastic adhesive material.

10. The method of claim 8, wherein the adhesive layer has a web, mesh or grid structure.

11. The method of claim 1, comprising tensioning the strap around the stack of strips.

12. The method of claim 1, comprising arranging a layer of pre-cured material over the stack and arranging one or more fibrous layers over the pre-cured layer before infusing the components with resin.

13. A wind turbine blade made according to the method of claim 1.

14. An elongate spar structure for a wind turbine blade, the spar structure comprising a stack of strips of fibre-reinforced polymeric material strapped together with at least one strap made of a fibrous material, the at least one strap being wrapped around a periphery of the stack of strips, wherein the at least one strap is integrated with the stack by cured resin, and wherein the at least one strap is wrapped around the stack such that first and second ends of the at least one strap overlap.

15. The elongate spar structure of claim 14, wherein the at least one strap is made from a fibrous material having a density between 50 and 500 grams per square metre.

16. The elongate spar structure of claim 14, wherein the at least one strap is made of a glass fibre material.

17. The elongate spar structure of claim 14, wherein a layer of adhesive material is provided between the overlapping first and second ends of the strap.

18. The elongate spar structure of claim 17, wherein the adhesive material is a thermoplastic adhesive material.

19. The elongate spar structure of claim 17, wherein the layer of adhesive material is formed as a web, mesh or grid structure.

20. The elongate spar structure of claim 14, comprising a plurality of straps.

21. A wind turbine blade comprising one or more elongate spar structures according to claim 14.

* * * * *